US012060665B2

(12) United States Patent
Yamada

(10) Patent No.: US 12,060,665 B2
(45) Date of Patent: Aug. 13, 2024

(54) PULP FIBROUS ACCUMULATED SHEET AND METHOD FOR PRODUCING PULP FIBROUS ACCUMULATED SHEET

(71) Applicant: LEC, INC., Tokyo (JP)

(72) Inventor: Kikuo Yamada, Shinagawa-ku (JP)

(73) Assignee: LEC, INC., Tokyo (JP)

( * ) Notice: Subject to any disclaimer, the term of this patent is extended or adjusted under 35 U.S.C. 154(b) by 1042 days.

(21) Appl. No.: 16/398,367

(22) Filed: Apr. 30, 2019

(65) Prior Publication Data

US 2019/0257013 A1 Aug. 22, 2019

Related U.S. Application Data

(62) Division of application No. 15/545,166, filed as application No. PCT/JP2016/052282 on Jan. 27, 2016, now abandoned.

(30) Foreign Application Priority Data

Jan. 29, 2015 (JP) ................................ 2015-015594
Feb. 4, 2015 (JP) ................................ 2015-020532
Dec. 25, 2015 (JP) ................................ 2015-253941

(51) Int. Cl.
*D04H 1/425* (2012.01)
*B27N 3/00* (2006.01)
(Continued)

(52) U.S. Cl.
CPC ............... *D04H 1/425* (2013.01); *B27N 3/00* (2013.01); *B27N 3/04* (2013.01); *D04H 1/50* (2013.01);
(Continued)

(58) Field of Classification Search
CPC ........ D04H 1/545; D04H 1/645; D04H 1/732; D21F 3/10; B65H 3/14
See application file for complete search history.

(56) References Cited

U.S. PATENT DOCUMENTS 2,863,715 A * 12/1958 Goldman ................ D04H 1/64 427/389.9
2,931,421 A * 4/1960 Schuller .................. D04H 1/74 28/103
(Continued)

FOREIGN PATENT DOCUMENTS

CN 1736311 A 2/2006
JP 2008-48996 A 3/2008
(Continued)

OTHER PUBLICATIONS

Combined Taiwanese Office Action and Search Report issued Aug. 2, 2019 in corresponding Taiwanese Patent Application No. 105116617 (with English Translation of Category of Cited Documents) 15 pages
(Continued)

*Primary Examiner* — Andrew D Graham
(74) *Attorney, Agent, or Firm* — Oblon, McClelland, Maier & Neustadt, L.L.P.

(57) ABSTRACT

Provided is a pulp fibrous accumulated sheet including: a liquid permeable pulp fibrous accumulated layer containing a crushed pulp or base-fibers mainly including a crushed pulp, and a binder; and a plurality of fiber crimped parts formed by compression and pressurization, the fiber crimped parts being formed so that crushed pulp fibers each straddling the adjacent fiber crimped parts are present.

10 Claims, 7 Drawing Sheets

(51) Int. Cl.

| | |
|---|---|
| ***B27N 3/04*** | (2006.01) |
| ***D04H 1/50*** | (2012.01) |
| ***D04H 1/54*** | (2012.01) |
| ***D04H 1/587*** | (2012.01) |
| ***D04H 1/732*** | (2012.01) |
| ***D21F 11/00*** | (2006.01) |
| *B27N 1/00* | (2006.01) |
| *B27N 3/24* | (2006.01) |

(52) U.S. Cl.
CPC ............... *D04H 1/54* (2013.01); *D04H 1/587* (2013.01); *D04H 1/732* (2013.01); *D21F 11/00* (2013.01); *B27N 1/00* (2013.01); *B27N 3/24* (2013.01)

(56) References Cited

U.S. PATENT DOCUMENTS 3,017,918 A * 1/1962 Maillard ............. D06M 15/233 425/363
5,246,772 A * 9/1993 Manning ................... B32B 5/12 442/364
5,264,269 A 11/1993 Kakiuchi
5,445,777 A * 8/1995 Noel ................. A61F 13/15658 264/510
5,547,541 A * 8/1996 Hansen ............... D06M 13/288 162/158
5,840,633 A * 11/1998 Kurihara .................. D04H 3/02 428/374
6,086,950 A * 7/2000 Masaki .................. D04H 1/732 427/389.9
6,141,833 A * 11/2000 Soerensen ............. D01G 25/00 19/161.1
6,340,411 B1 * 1/2002 Hansen .................. D04H 1/587 162/173
6,375,773 B1 * 4/2002 Andersen ................. D04H 1/12 28/104
6,440,881 B1 8/2002 Ercken
6,485,667 B1 * 11/2002 Tan ....................... A61F 13/534 264/510
6,540,853 B1 * 4/2003 Suzuki ............. A61F 13/15642 156/181
6,964,726 B2 * 11/2005 Chen ...................... B41M 3/006 162/134
7,041,196 B2 * 5/2006 Lorenz .................... D21F 11/04 162/146
7,378,360 B2 * 5/2008 Clark ...................... A47L 13/17 442/415
7,758,724 B2 7/2010 Akai
8,257,553 B2 * 9/2012 Zwick .................... D21H 27/30 162/158
2001/0005926 A1 * 7/2001 Noelle ................... D04H 1/732 28/165
2001/0023160 A1 * 9/2001 Yamada ................... D04H 1/64 442/413
2002/0025435 A1 * 2/2002 Hansen ............... D06M 13/285 428/403
2002/0180092 A1 * 12/2002 Abba ....................... D04H 1/54 264/119
2003/0217448 A1 * 11/2003 Andersen ............... D04H 1/732 28/104
2004/0192136 A1 * 9/2004 Gusky ....................... D21F 9/00 442/264
2004/0198114 A1 * 10/2004 Barnholtz ................ D04H 1/49 442/1
2005/0066494 A1 * 3/2005 Ames ................ A61F 13/15617 28/282
2005/0148261 A1 * 7/2005 Close ..................... A61Q 19/00 442/381
2006/0037724 A1 2/2006 Akai et al.
2006/0042049 A1 * 3/2006 Petersen ................ D04H 1/732 19/296
2006/0137798 A1 * 6/2006 Haque .................... D04H 1/593 156/62.2
2006/0230589 A1 * 10/2006 Christensen ........... D04H 1/492 28/117
2006/0275347 A1 * 12/2006 Evers Smith ........ D04H 13/002 424/443
2007/0018364 A1 * 1/2007 Riviere .................. D06C 15/00 425/149
2007/0056674 A1 * 3/2007 Sellars ................... D04H 11/00 264/109
2007/0292547 A1 * 12/2007 Christensen ........... D04H 1/732 425/80.1
2009/0126885 A1 5/2009 Akai et al.
2010/0192636 A1 * 8/2010 Valero .................. D04H 1/4218 210/765
2010/0207298 A1 * 8/2010 Kunze ...................... D01G 9/00 264/321
2010/0311296 A1 * 12/2010 Boehmer ............... D21H 21/28 427/370
2011/0021101 A1 * 1/2011 Hawkins .............. D04H 1/4218 527/311
2011/0061214 A1 * 3/2011 Wirtz ..................... D04H 1/425 28/104
2011/0086567 A1 * 4/2011 Hawkins .................. C08K 5/06 106/206.1
2011/0154627 A1 * 6/2011 Chou ........................ D01F 2/00 28/107
2012/0107568 A1 * 5/2012 Manifold ............. D21F 11/006 162/204
2012/0133092 A1 * 5/2012 Fuda ........................ B65H 3/14 271/104
2012/0168104 A1 7/2012 Hadejiri
2013/0095989 A1 * 4/2013 Eichler ..................... D21F 2/00 492/15
2013/0213879 A1 * 8/2013 Petschauer ................ D21F 3/10 210/386
2014/0038485 A1 * 2/2014 Anderson .............. D06M 15/11 252/8.61
2014/0130997 A1 * 5/2014 Klerelid .................... D21F 3/10 162/217

FOREIGN PATENT DOCUMENTS

JP 2010-131543 A 6/2010
JP 2012-41192 A 3/2012

OTHER PUBLICATIONS

International Search Report issued Mar. 1, 2016, in PCT/JP2016/052282 filed Jan. 27, 2016.

* cited by examiner

PULP FIBROUS ACCUMULATED SHEET AND METHOD FOR PRODUCING PULP FIBROUS ACCUMULATED SHEET

This application is a divisional of U.S. patent application Ser. No. 15/545,166, filed Jul. 20, 2017, which is the National Stage of the International Patent Application No. PCT/JP2016/052282, filed Jan. 27, 2016, the disclosures of which are incorporated herein by reference in their entireties. This application claims priority to Japanese Application Nos. 2015-253941 filed Dec. 25, 2015, 2015-020532 filed Feb. 4, 2015, and 2015-015594 filed Jan. 29, 2015.

TECHNICAL FIELD

The present invention relates to a pulp fibrous accumulated sheet that can be used as a cleaning sheet, and a method for producing the pulp fibrous accumulated sheet.

BACKGROUND ART

A wet tissue constituted by a first layer formed of a tissue web containing cellulose fibers, and a second layer formed of an air laid nonwoven fabric web is exemplified (see Patent Literature 1, Claim 11 of Claims).

The wet tissue of Patent Literature 1 requires a first layer (this is obtained by papermaking), a second layer for which the production method is different from that of the first layer (this is obtained by an air laid method), and a binder for integrating the two layers. Furthermore, the first layer gave strength to the wet tissue, but lowered the softness of the wet tissue.

CITATION LIST

Patent Literature

Patent Literature 1: U.S. Pat. No. 8,257,553

SUMMARY OF INVENTION

Technical Problem

The main problem to be solved by the invention is to provide a pulp fibrous accumulated sheet, which can be produced without undergoing a papermaking step, whose shape is maintained without forming a multi-ply body with a sheet formed by papermaking, and which has an appropriate strength.

Solution to Problem

To achieve the above object, according to the present invention, there is provided a pulp fibrous accumulated sheet including: a liquid permeable pulp fibrous accumulated layer containing a crushed pulp or base-fibers mainly including a crushed pulp, and a binder; and a plurality of fiber crimped parts formed by compression and pressurization, the fiber crimped parts being formed so that crushed pulp fibers each straddling the adjacent fiber crimped parts are present.

In a preferable aspect, the content of the binder with respect to the liquid permeable pulp fibrous accumulated layer is 1 to 20% by weight. Furthermore, in a preferable aspect, the binder is carboxylmethyl cellulose. Furthermore, in a preferable aspect, the binder is a polyvinyl alcohol. In a preferable aspect, the pulp fibrous accumulated sheet is in a wet state by having been further impregnated with a chemical composition. Furthermore, in a preferable aspect, the binder is contained in a crosslinked state. Furthermore, in a preferable aspect, the compressed and pressurized parts are formed by embossing.

Furthermore, to achieve the above object, according to the present invention, there is provided a method for producing a pulp fibrous accumulated sheet, including:

- a fiber accumulating step of forming a fibrous accumulated body on a mesh body by subjecting a crushed pulp or base-fibers mainly including a crushed pulp to fiber accumulation by aspiration;
- a compression and pressurization step of compressing and pressurizing the obtained fibrous accumulated body to thereby form the plurality of fiber crimped parts on the fibrous accumulated body so that crushed pulp fibers each straddling the adjacent fiber crimped parts are present;
- a binder application step of applying a binder onto at least one surface of the fibrous accumulated body on which the fiber crimped parts have been formed; and
- a drying step of drying the fibrous accumulated body after the binder application step to form a liquid permeable pulp fibrous accumulated layer.

In a preferable aspect, the binder is applied onto the both surfaces of the fibrous accumulated body in the binder application step. Furthermore, in a preferable aspect, the compression and pressurization step is conducted by means of an emboss roll. Furthermore, in a preferable aspect, pressurization by a planar roll is further conducted before the compression and pressurization step by the emboss roll. Furthermore, in a preferable aspect, the drying step is conducted by drying with electromagnetic wave. Furthermore, in a preferable aspect, the binder is carboxylmethyl cellulose. Furthermore, in a preferable aspect, the binder is a polyvinyl alcohol.

Furthermore, according to claim 15, there is provided a method for producing a pulp fibrous accumulated sheet, in a method for producing a fibrous accumulated sheet by using crushed base-fibers, the method including: a step of applying a binder onto the base-fibers from a first direction, and adsorbing the base-fibers along the first direction; and a step of applying a binder onto the base-fibers from a second direction, which is different from the first direction, and adsorbing the base-fibers along the second direction.

Advantageous Effect of Invention

The pulp fibrous accumulated sheet according to this invention can be produced without undergoing a papermaking step, the shape thereof is maintained without forming a multi-ply body with a sheet formed by papermaking, and the pulp fibrous accumulated sheet has an appropriate strength.

DESCRIPTION OF EMBODIMENTS

Figure 1:
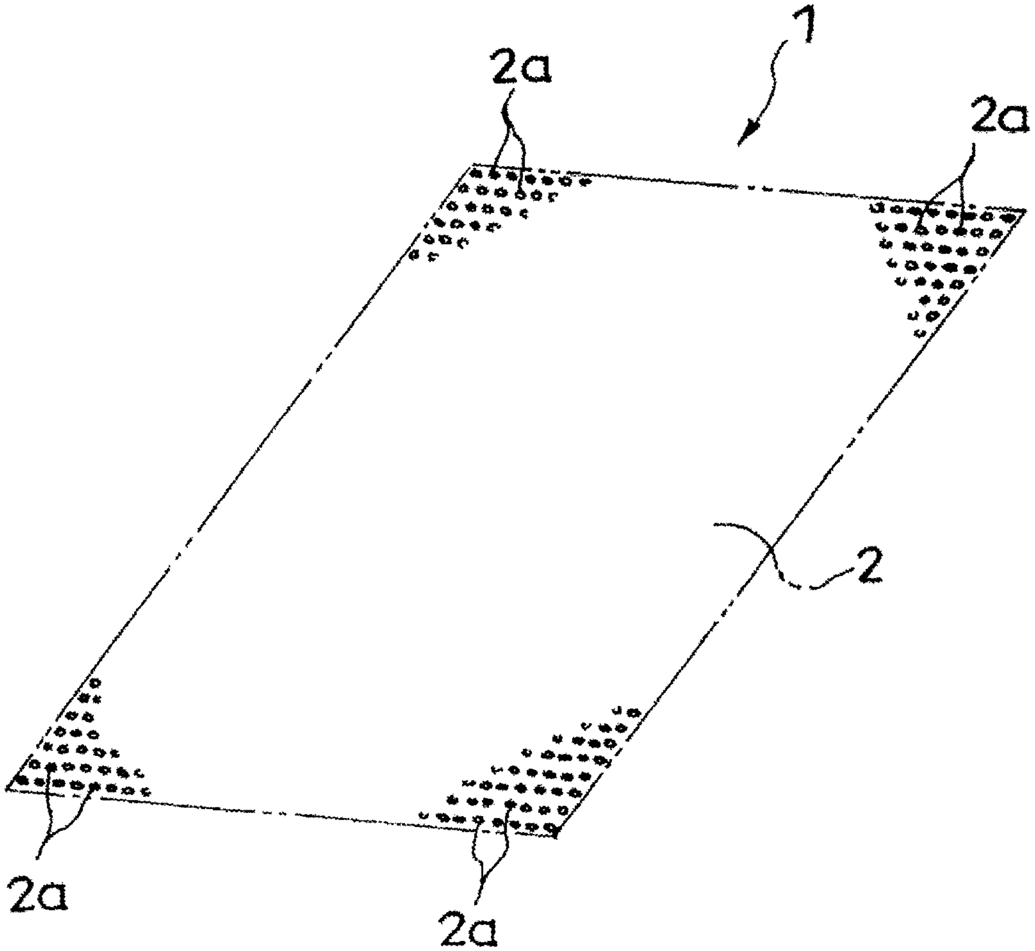
FIG. 1 is a perspective constitutional view of a pulp fibrous accumulated sheet according to an embodiment of the present invention.

The typical embodiments of the present invention will be explained below based on FIGS. 1 to 7. A pulp fibrous accumulated sheet 1 according to this embodiment is formed of a liquid permeable pulp fibrous accumulated layer 2 having one or two or more layer(s), and is typically suitable for use in non-water-disintegrable cleaning sheets for cleaning, water-disintegrable cleaning sheets for body cleaning, and water-disintegrable cleaning sheets such as toilet cleaners. Furthermore, a production method according to this embodiment can produce the pulp fibrous accumulated sheet 1 reasonably and suitably.

Such pulp fibrous accumulated sheet 1 has a liquid permeable pulp fibrous accumulated layer 2 formed of base-fibers including crushed pulp 5 or mainly including the crushed pulp 5, and a binder; and includes a plurality of fiber crimped parts 2_a_, 2_a_ . . . which have been formed by compression and pressurization, and have been formed so that crushed pulp fibers 2_b_ each straddling the adjacent fiber crimped parts 2_a_ and 2_a_ are present.

The above-mentioned liquid permeable pulp fibrous accumulated layer 2 is constituted by an aggregate of many fibers and has water absorbability. The liquid permeable pulp fibrous accumulated layer 2 can be formed by natural fibers such as pulp, recycled fibers such as rayon, or a mixture of natural fibers and recycled fibers, or the like. As natural fiber other than pulp, for example, kenaf, bamboo fiber, straw, cotton, cocoon filaments, and sugar cane can be used. It is preferable that the liquid permeable pulp fibrous accumulated layer 2 is constituted so that the degrees of denseness of the fibers in the thickness direction are different. The crushed pulp 5 as used herein refers to a cotton-like substance obtained by finely crushing a pulp material used as a base material for paper materials by means of a crusher or the like. Examples of the base material of the crushed pulp 5 can include wood pulp, synthetic pulp, and used paper pulp, and a toilet paper material can also be used. As the toilet paper material, a toilet paper material containing softwood bleached kraft pulp and hardwood bleached kraft pulp can be used, and it is preferable to use a base material pulp formed of softwood bleached kraft pulp in view of production. Since softwood bleached kraft pulp has a longer fiber length than that of hardwood bleached kraft pulp, when the liquid permeable pulp fibrous accumulated layer 2 is constituted by using a crushed pulp 5 obtained from softwood wood bleached kraft pulp, the degree of mutual entanglement of the fibers is enhanced, and consequently, the strength is improved. Furthermore, since the volume of each space between fibers by mutual entanglement of the fibers becomes larger than that in the case when hardwood bleached kraft pulp, which has a short fiber length, or the like is used, and the softness is improved since the degree of freedom of the movement of each fiber increases.

In the case when the base-fibers are a material containing the crushed pulp 5 as a major base material, the content ratio of the crushed pulp 5 is preferably 30% or more, more preferably 50% or more. Furthermore, it is desirable that the content ratio of the crushed pulp 5 is preferably 80% or more, and it is more preferable that 100% is formed by the crushed pulp 5. Since the crushed pulp 5 is obtained by crushing a pulp material and forming into a cotton-like shape, many spaces have been formed among the fibers as compared to paper formed by papermaking in which fibers are in a compressed state. When many spaces have been formed among the fibers, the degree of freedom of movement of each of the fibers constituting the liquid permeable pulp fibrous accumulated layer 2 can be increased. Therefore, by presetting the content of the crushed pulp 5 to be of the above-mentioned ratio, the bulk forming function of the liquid permeable pulp fibrous accumulated layer 2 can be increased even at less than a weight per part area. Consequently, the entire softness can be improved, and the production efficiency during the production can be improved.

The weight per part area of the liquid permeable pulp fibrous accumulated layer 2 is preferably 80 $g/m^2$ or less, more preferably 60 $g/m^2$ or less. By presetting the weight per part area of the liquid permeable pulp fibrous accumulated layer 2 to be within the above-mentioned range, the production and packaging of pulp fibrous accumulated sheet 1 can be made easy, and the sheet can be constituted so as to have bulkiness that enables easy use and packaging of users. Furthermore, by presetting the weight per part area to be within the above-mentioned range, the fiber density does not become too high. As a result, the amount of the binder for joining the fibers can be decreased. Accordingly, a large amount of binder adheres to the surface of the liquid permeable pulp fibrous accumulated layer 2, and the adhered binder forms a film, whereby decrease in the liquid permeability of the liquid permeable pulp fibrous accumulated layer 2 can be prevented, and thus the entire water absorbability of the pulp fibrous accumulated sheet 1 can be ensured.

As the above-mentioned binder, various binders can be used. Examples of the binder that can be used in the present invention include polysaccharide derivatives, natural polysaccharides, and synthetic polymers. Examples of the polysaccharide derivatives include carboxymethyl cellulose (CMC), carboxyethyl cellulose, carboxymethylated starch or a salt thereof, starch, methyl cellulose, and ethyl cellulose. Examples of the natural polysaccharides include guar gum, tragacanth gum, xanthan gum, sodium alginate, carrageenan, gum arabic, gelatin, and casein. Furthermore, examples of the synthetic polymers include polyvinyl alcohols (PVAs), ethylene-vinyl acetate copolymerized resins (EVAs), polyvinyl alcohol derivatives, polymers or copolymers of unsaturated carboxylic acids, and salts thereof, and examples of the unsaturated carboxylic acids include acrylic acid, methacrylic acid, maleic anhydride, maleic acid, and fumaric acid. Among the above-mentioned binders, carboxymethyl cellulose and polyvinyl alcohols are specifically preferable.

If the above-mentioned binder is a crosslinked binder, it is preferable since the physical strength of the pulp fibrous accumulated sheet 1 is improved. The crosslinker for crosslinking the binder is obtained by causing a crosslinking action with the binder to impart a crosslinking structure to the binder, to thereby improve the physical strength. As the crosslinker, a polyvalent metal ion is preferably used in the case when a binder having a carboxyl group such as carboxymethyl cellulose is used, and examples of this polyvalent metal ion include metal ions of alkaline earth metals such as zinc, calcium and barium, magnesium, aluminum, manganese, iron, cobalt, nickel and copper. Among these, ions of zinc, calcium, barium, magnesium, aluminum, iron, cobalt, nickel and copper are preferably used. These are preferable in imparting sufficient wet strength. The above-mentioned polyvalent metal ion as the crosslinker is used in the form of a sulfate, a chloride, a hydroxide, a carbonate, or a nitrate. Furthermore, in the case when a polyvinyl alcohol is used as the water-soluble binder, a titanium compound, a boron compound, a zirconium compound, and a compound containing silicon can be used as the crosslinker, and among these compounds, one or plural kind(s) can be mixed and used as the crosslinker. Examples of the titanium compound include titanium lactate, and titanium triethanol aminate, and examples of the boron compound include borax, and boric acid. Examples of the zirconium compound include zirconium ammonium carbonate, and examples of the compound containing silicon include sodium silicate.

The content of the binder in such pulp fibrous accumulated sheet 1 to the liquid permeable pulp fibrous accumulated layer 2 is preferably 1 to 20% by weight. When this content is lower than 1% by weight, the strength of the pulp fibrous accumulated sheet 1 is insufficient, whereas when the content is greater than 20% by weight, the softness of the pulp fibrous accumulated sheet 1 is lowered.

The liquid permeable pulp fibrous accumulated layer 2 that forms such pulp fibrous accumulated sheet 1 includes the plurality of fiber crimped parts 2*a*, 2*a* . . . formed by compression and pressurization, and the fiber crimped parts 2*a* are formed so that crushed pulp fibers 2*b* each straddling the adjacent fiber crimped parts 2*a* and 2*a* are present. Therefore, the shape of the pulp fibrous accumulated sheet 1 is stably maintained, and the pulp fibrous accumulated sheet 1 has appropriate strength and suitable softness. When a water-soluble binder such as carboxymethyl cellulose is used as the above-mentioned binder, such pulp fibrous accumulated sheet 1 becomes a water-disintegrable pulp fibrous accumulated sheet having fine water disintegrability. Furthermore, in the case when a polyvinyl alcohol is used as the above-mentioned binder, either a water-disintegrable pulp fibrous accumulated sheet having fine water disintegrability or a non-water-disintegrable pulp fibrous accumulated sheet can be formed depending on conditions. In the present invention, water-disintegration refers to that the adhesion strength between fibers that constitute a paper sheet has a minimum strength required for functions such as molding and wiping of the paper sheet in a dry state, whereas when the paper sheet is in a state that the paper sheet is significantly immersed in water such as in the case when the paper sheet is disposed in water, the adhesion strength thereof is extremely lowered, and the paper sheet is easily decomposed or dispersed when a certain outer force is applied thereto. Furthermore, in the present invention, non-water-disintegration refers to that the adhesion strength between fibers that constitute a paper sheet has a minimum strength required for functions such as molding and wiping of the paper sheet in a dry state, and even when the paper sheet is in a wet state such that the paper sheet is significantly immersed in water, the paper sheet is not easily dispersed when a certain outer force is applied thereto.

That is, such pulp fibrous accumulated sheet 1 is produced without undergoing a papermaking step, and the shape of the sheet 1 is maintained even if the sheet 1 is not formed into a multi-ply body with a sheet formed by papermaking, and the sheet 1 has an appropriate strength.

Figure 2:
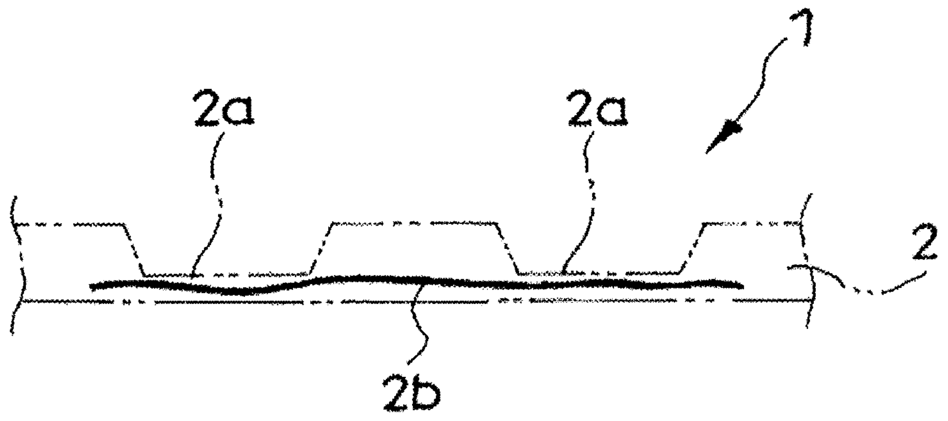
FIG. 2 is a cross-sectional constitutional view of a major portion of the pulp fibrous accumulated sheet.
Figure 3:
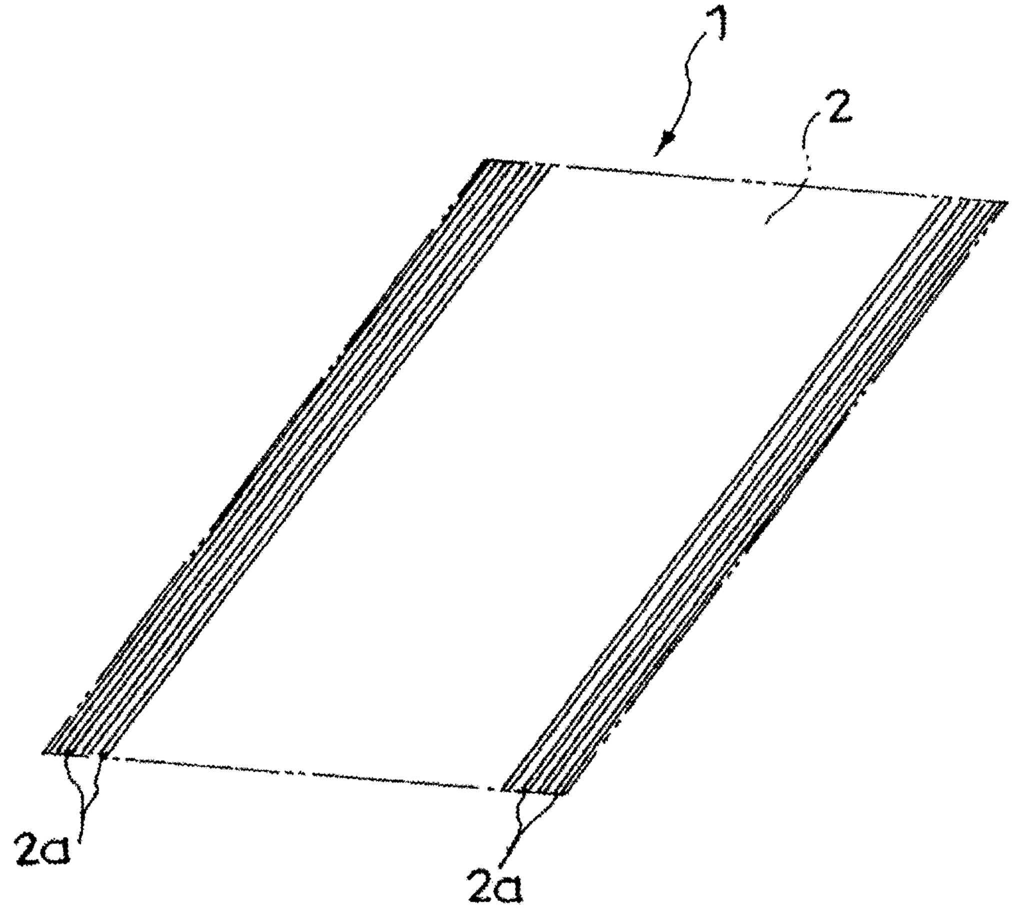
FIG. 3 is a perspective constitutional view of the pulp fibrous accumulated sheet having a linear fiber crimped part.

The schematic constitution of the pulp fibrous accumulated sheet 1 according to FIGS. 1 and 2 is indicated. The pulp fibrous accumulated sheet 1 includes the plurality of fiber crimped parts 2*a* constituting fine concaves in a disseminated manner. The distance between the adjacent fiber crimped parts 2*a* and the fiber length of the crushed pulp fiber 2*b* are adjusted so that the crushed pulp fiber 2*b* straddling the adjacent fiber crimped parts 2*a* and 2*a* is present. The crushed pulp fiber 2*b* may straddle the fiber crimped parts 2*a* at three or more portions. It is preferable that the compressed and pressurized parts are formed by embossing. It is sufficient as long as the plurality of fiber crimped parts 2*a* are included, and the shapes thereof may be suitably modified as necessary. In the example shown in FIG. 3, such fiber crimped parts 2*a* are such that the concave-shaped fiber crimped parts 2*a* are in linear forms in the pulp fibrous accumulated sheet 1.

If such pulp fibrous accumulated sheet 1 has been impregnated in a chemical composition to put the sheet 1 into a wet state in advance, then the sheet 1 can be utilized as a body wiper for infants, a toilet cleaner, or other cleaning sheet.

Secondly, the above-mentioned production method includes:

- a fiber accumulating step of forming a fibrous accumulated body on a mesh body by subjecting base-fibers including a crushed pulp 5 or mainly including a crushed pulp 5 to fiber accumulation by aspiration;
- a compression and pressurization step of compressing and pressurizing the obtained fibrous accumulated body to thereby form the plurality of fiber crimped parts 2*a* on the fibrous accumulated body so that crushed pulp fibers 2*b* each straddling the adjacent fiber crimped parts 2*a* are present;
- a binder application step of applying a binder onto at least one surface of the fibrous accumulated body; and
- a drying step of drying the fibrous accumulated body after the binder application step to give a liquid permeable pulp fibrous accumulated layer 2.

Figure 4:
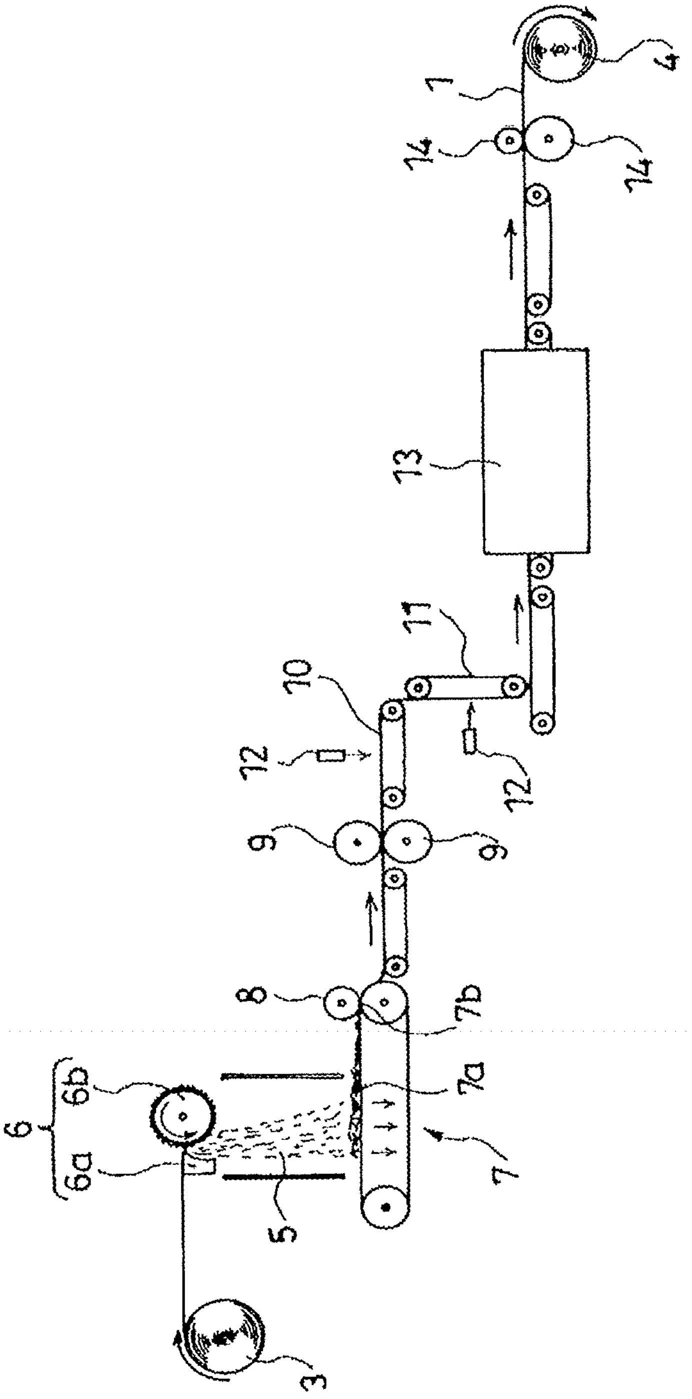
FIG. 4 is a constitutional view showing an example of a production process of the pulp fibrous accumulated sheet.

The schematic constitution of the production method in FIG. 4 is shown. In the drawing, a reference numeral 3 represents an original fabric of a pulp material that becomes the above-mentioned base-fibers, and in the drawing, a reference numeral 4 represents a wind-up body of the generated pulp fibrous accumulated sheet 1.

(1) The pulp material is first sent to a crushing device 6 to form the crushed pulp 5. A reference numeral 6*a* represents a fixed blade that constitutes the crushing device 6, and a reference numeral 6*b* represents a rotary blade that constitutes the crushing device 6.

(2) The crushed pulp 5 becomes a fibrous accumulated body, which finally becomes the pulp fibrous accumulated sheet 1, in a fiber accumulating device 7. The fiber accumulating device 7 is constituted so that the crushed pulp 5 is adsorbed on the upper surface of a conveyor belt 7*a* having a mesh-like shape as the mesh body that receives the crushed pulp 5 by applying a negative pressure to the inside of the conveyor belt 7*a*.

(3) In this embodiment, pressurization by a planar roll 8 is further conducted on the fibrous accumulated body before the compression and pressurization step. In the illustrated example, on the upper side of an unloading end 7*b* of the conveyor belt 7*a* that constitutes the fiber accumulating device 7, the planar roll 8, which interposes the fibrous accumulated body between the planar roll 8 and the unloading end 7*b*, is disposed. By this way, in this embodiment, the fibrous accumulated body is sent in a sheet-like form that is difficult to adhere to emboss rolls 9, which will be mentioned below, in the compression and pressurization step.

(4) In this embodiment, the compression and pressurization step on the fibrous accumulated body is conducted by embossing by using emboss rolls. In the illustrated example, the fibrous accumulated body is sent to between a pair of upper and lower emboss rolls 9 and 9, whereby the plurality of fiber crimped parts 2*a* are formed on the liquid permeable pulp fibrous accumulated layer 2 so that crushed pulp fibers 2*b* each straddling the plurality of adjacent fiber crimped parts 2*a* and 2*a* are present. As the emboss rolls, conventionally-known emboss rolls each having many projections for embossing on the circumference surface of each roll can be used. The liquid permeable pulp fibrous accumulated layer 2 at this time is in a non-wet state, and the embossing is conducted on the fibrous accumulated layer in a non-wet state. The non-wet state does not include the mode in which moisture is supplied to the liquid permeable pulp fibrous accumulated layer 2 such as by blowing water on the liquid permeable pulp fibrous accumulated layer 2. Ordinarily, paper materials include moisture (water content) corresponding to conditions of air temperature and humidity, but the moisture (water content) is not water content positively supplied from outside. Because of this, even if such moisture (water content) is included, this corresponds to the non-wet state according to the present invention. Accordingly, the percentage content of moisture (water content) in the fibrous accumulated layer varies depending on the conditions of air temperature and humidity, and even when the percentage content shows any numeric value, it can be understood that this corresponds to the non-wet state according to the present invention.

(5) For the fibrous accumulated body that has undergone the compression and pressurization step, in the illustrated example, a binder is fed to one surface of this fibrous accumulated body from above a conveyor 10, which is configured to allow fiber accumulation (mounting) of this fibrous accumulated body on the upper surface and transport the fiber accumulated body, and by feeding the binder onto another surface of this fibrous accumulated body from the lateral side of the conveyor 11, which is configured to transport this fibrous accumulated body in the longitudinal direction, the binder is applied onto the both surfaces of the fibrous accumulated body. In some cases, such binder is applied onto only one surface of the fibrous accumulated body. The binder is fed typically by spraying a solution of the binder from a nozzle 12 of a spraying device. As the spraying nozzle 12 used for spraying, a conventionally-known spraying nozzle may be optionally selected and used. The feeding of the binder is not limited to the spraying, and other known methods such as application by means of roll-like application devices such as a gravure printer and a flexo printer may also be used. The crosslinker can be fed together with the binder, but the feeding is not limited to the case when the crosslinker can be fed together with the binder, and the crosslinker can be fed and added at an optional time point during the production steps.

(6) The fibrous accumulated body to which the binder has been applied is sent to a drying device 13, and dried. It is preferable that such drying is conducted by electromagnetic wave drying. This is because, if a long time is required for the drying in a state that the binder has been applied on the fibrous accumulated body on which the plurality of fiber crimped parts 2*a* have been formed by the compression and pressurization step, the shape of the fiber crimped part 2*a* is easily lost. For such drying, a conventionally-known method such as hot air drying or infrared ray drying may be optionally selected and used. Furthermore, such drying is not limited to the case when the drying is conducted by one drying device, and a plurality of multiple drying devices may be installed, and the drying may also be conducted while sequentially sending the liquid permeable pulp fibrous accumulated layer 2 to the respective drying devices.

In this embodiment, the fibrous accumulated body is not dried after the application of the binder and subsequently embossed, but the binder is applied after the embossing and the fibrous accumulated body is then dried. If the binder is applied before the embossing, the fibers that constitute the fibrous accumulated body are not a little damaged during the embossing, and the surface layer of the binder formed on the surface of the fibrous accumulated body is also not a little damaged, whereas this embodiment has an advantage that the fibrous accumulated body, eventually a cleaning sheet 1 to be formed therefrom, is prevented from causing such damage.

(7) Furthermore, in this embodiment, after the drying, the both end parts along the transport direction of the fibrous accumulated body are respectively cleaved in a linear manner along this transport direction to thereby prepare the shape of the pulp fibrous accumulated sheet 1 generated from the fibrous accumulated body. In the illustrated example, the above-mentioned cleaving is conducted by sending the fibrous accumulated body to between a pair of upper and lower slitter rolls 14 and 14.

(8) The pulp fibrous accumulated sheet 1 generated as above is folded as necessary. Furthermore, by impregnating the pulp fibrous accumulated sheet 1 generated as above with a chemical composition, this sheet 1 can be a sheet available as a body wiper for infants, a toilet cleaner or other cleaning articles.

Secondly, a method for producing a pulp fibrous accumulated sheet 101 by an air laid system of the second embodiment will be explained by using FIGS. 5 to 7. In the second embodiment, since the above-mentioned exemplary embodiment can be suitably applied to the base materials (materials), weight per part area, applicable binder and crosslinker, and drying system for the pulp fibrous accumulated sheet 101, the overlapping explanations are omitted. In addition, in FIG. 5, in order to prevent the drawing from being made complex, the reference numerals are imparted to only the final part of a production line 100 for the pulp fibrous accumulated sheet 101, and illustration is omitted in other parts. Similarly, the illustration of the pulp fibers 103 is also omitted.

Figure 5:
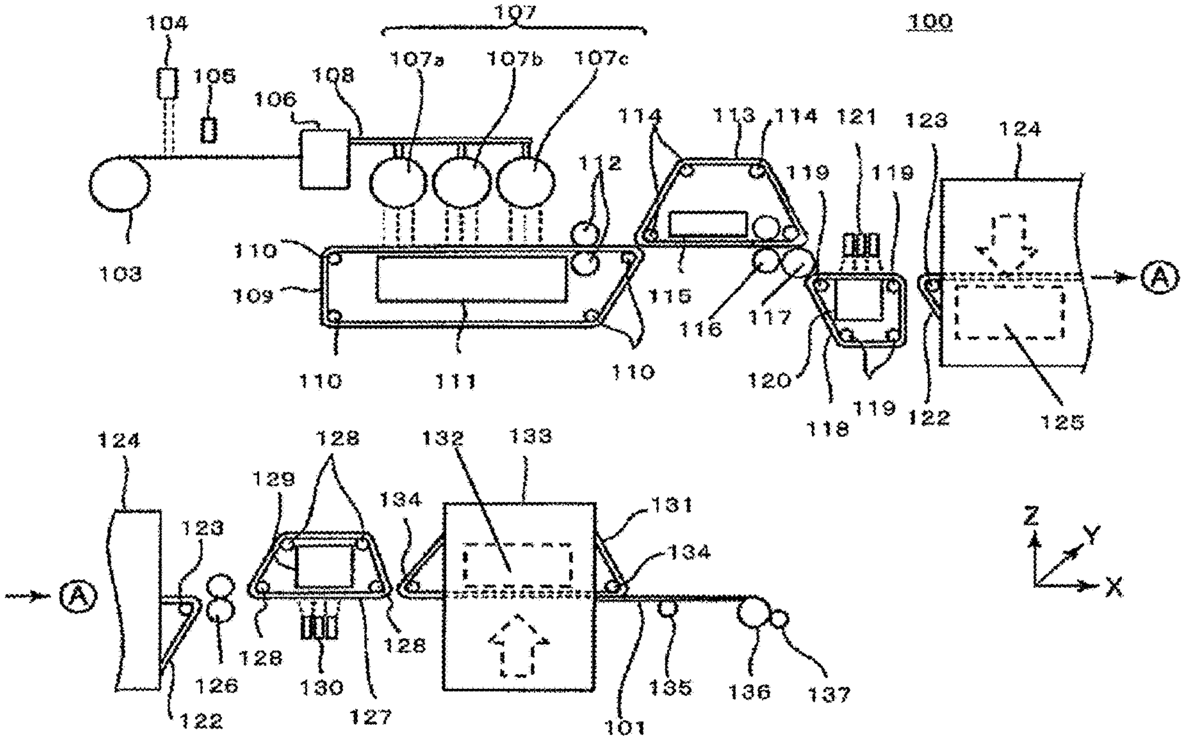
FIG. 5 is a drawing showing a schematic view of a production line 100 of a pulp fibrous accumulated sheet 101 according to a second embodiment.

FIG. 5 is a drawing showing a schematic view of the production line 100 for the pulp fibrous accumulated sheet 101 of the second embodiment. The steps for the production of this production line 100 roughly include a pre-crushing step, a crushing step, a fiber accumulating step, a pressurization step, a binder application step and a drying step.

The pre-crushing step includes a liquid feeding step and a pulp detection step. The liquid feeding step is a step of feeding a liquid to the pulp fibers 103 by means of a liquid feeding device 104. The pulp detection step is a step of detecting whether or not the pulp fibers 103 have been fed to the production line 100 by means of a pulp detection device 105. The width of the pulp fibers 103 (the length in the direction y) is from about 900 mm to 1,800 mm, and the production line 100 is designed and produced according to that width.

Figure 6:
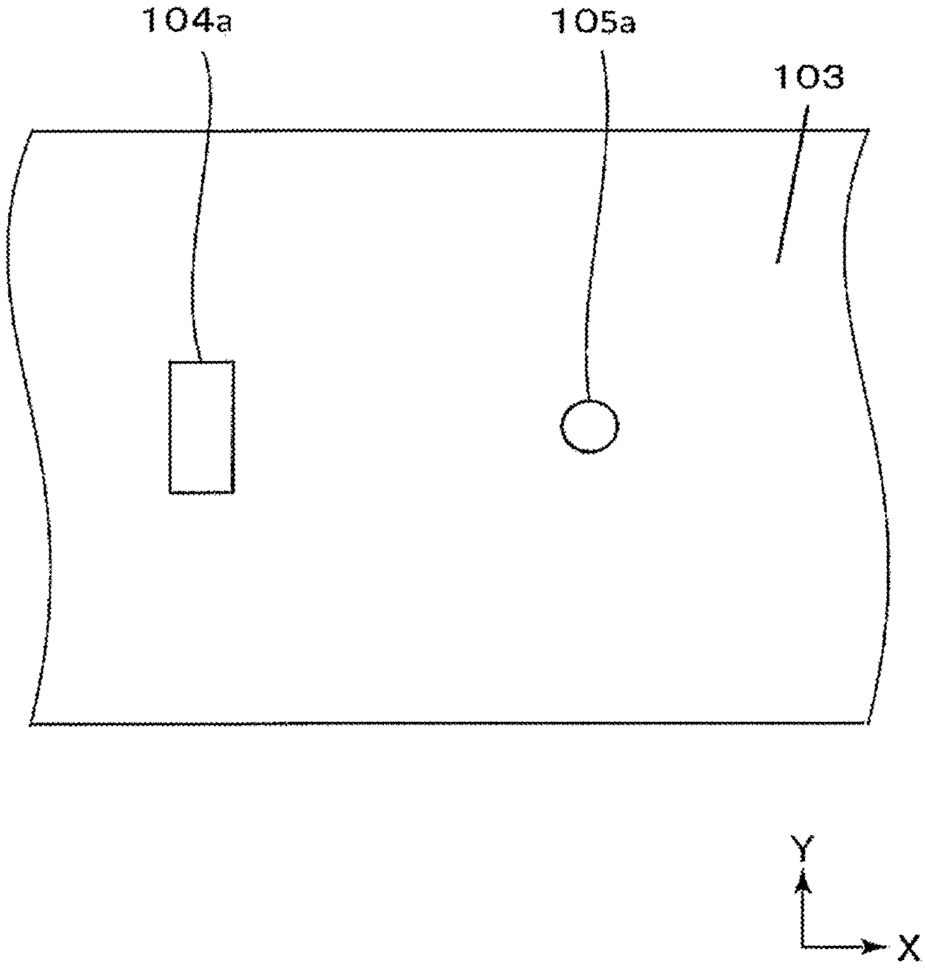
FIG. 6 is a schematic view showing a liquid feeding step and a pulp detection step.

FIG. 6 is a schematic view of the liquid feeding step and the pulp detection step. As shown in FIG. 6, in the liquid feeding step, the liquid feeding device 104 feeds a liquid to a central region 104*a* of the pulp fibers 103 that have been transported. As mentioned below, the pulp fibers 103 may be charged by static electricity for the fiber accumulation on the mesh and transport. Furthermore, the pulp fibrous accumulated sheet 101 produced by this production line 100 is sometimes used as an absorber for absorbing a produced excrement. Therefore, as the liquid to be fed by the liquid feeding device 104, a solution of ethanol, methanol, 2-propanol (IPA) or the like, or water can be used for preventing charging by static electricity. Furthermore, as the liquid to be fed by the liquid feeding device 104, active carbon; zeolite;

silica; ceramic; Oya stone; charcoal polymer; carbon nanotubes; carbon nanohorns; organic acids such as citric acid and succinic acid, alum (potassium alum) can be used for eliminating odor of an excrement.

Although one liquid feeding device 104 is illustrated as a part in FIG. 5, it is also possible to dispose a plurality of liquid feeding devices depending on intended use such as prevention of charging with static electricity or elimination of odor. Furthermore, not the central region 104*a* but a region shifted in the direction Y of FIG. 5 may be used as a liquid feeding region. In this exemplary embodiment, not the entirety of the direction Y of the pulp fibers 103 but the part region such as a central region 104*a* is used as a liquid feeding region. This is because the pulp fibers 103 are crushed into a cotton-like shape in the crushing step mentioned below, and thus the above-mentioned liquid is fed to almost the entirety of the pulp fibers 103 that have been crushed by this crushing. By this way, excess liquid feeding by the liquid feeding device 104 can be prevented, and the cost for the production of the pulp fibrous accumulated sheet 101 can be suppressed. For example, the length of the central region 104*a* in the direction Y is set to about 10% to 50% of the width of the pulp fibers 103, and the length of the direction X may be the same as the length in the direction Y, or may be shorter than the length in the direction Y (about 25% to 75%). In FIG. 6, the central region 104*a* has a rectangular shape, but may have a circular shape or an oval shape.

Furthermore, the amount of feeding of the liquid for preventing charging by static electricity can be adjusted in the liquid feeding device 104 in accordance with the humidity of the production line 100. Specifically, in the liquid feeding device 104, in the case when the inside of a room in which the production line 100 is installed is dry (for example, in the case when the humidity is 50% or less), the amount of feeding of the liquid for preventing charging by static electricity may be increased as compared to the amount in the case when the inside of a room in which the production line 100 is installed is not dry (for example, in the case when the humidity is 65% or more). That is, in the liquid feeding device 104, the amount of feeding of the liquid for preventing charging by static electricity may be increased depending on the decrease in humidity.

Similarly, the amount of feeding of a deodorant liquid may be changed in the liquid feeding device 104 in accordance with the intended use of the pulp fibrous accumulated sheet 101. Specifically, in the liquid feeding device 104, the feeding amount of the deodorant liquid may be increased in the above-mentioned absorber, or the feeding amount of the deodorant liquid may be decreased in an exterior body. As the deodorant liquid, a liquid in which a metal is dissolved is sometimes used. Therefore, the liquid feeding device 104 is configured to stop the feeding of the deodorant liquid in the case when the pulp fibrous accumulated sheet 101 is used as a skin surface (in the case when the sheet 101 is brought into contact with the skin).

Another pre-crushing step is a pulp detection step of detecting whether or not the pulp fibers 103 have been transported. This step is for detecting the state that all of the roll-like pulp fibers 103 have been transported and thus the pulp fibers 103 are not transported. A pulp detection device 105 emits detection light 105*a* downward to detect that the pulp fibers have been transported in the case when the reflected light from the pulp fibers 103 is detected by a detect part, which is not illustrated. The pulp detection device 105 evaluates that the pulp fibers have not been detected in the case when the above-mentioned reflected light cannot be detected by the detection part, which is not illustrated, and gives a warning by sound, luminescence or the like.

In the production line 100, subsequent to the pre-crushing step, the pulp fibers 103 are crushed by using a crushing device 106 in a crushing step. The crushing device 106 has a primary crushing part and a secondary crushing part, and the pulp fibers 103 are crushed into a chip-like shape by the primary crushing part, and the pulp fibers 103 that have been crushed into a chip-like shape are crushed into a cotton-like shape by the secondary crushing part. In the crushing step, in order to avoid the diffusion of the crushed pulp fibers 103, both the primary crushing part and the secondary crushing part are housed in a case or the like. Furthermore, in the second embodiment, it is desirable that the crushed pulp is 100%, but composite fibers (ES fibers) may be incorporated. Furthermore, the crushed pulp may be crushed into a cotton-like shape by the primary crushing part, and in this case, the secondary crushing part may be omitted.

In the production line 100, subsequent to the crushing step, the cotton-like pulp fibers 103 are subjected to fiber accumulation by using a fiber accumulating device 107 in a fiber accumulating step. The cotton-like pulp fibers 103 pass through a piping 108 by high pressure air or the like, and are stored in three tanks 107*a*, 107*b* and 107*c*. The number of the tanks is not limited to three. A cover for preventing diffusion is disposed also in the fiber accumulating step so as to prevent the diffusion of the cotton-like pulp fibers 103. By this way, operators of the production line 100 are prevented from inhaling the pulp fibers 103. Furthermore, in the second embodiment, the average fiber length of the crushed pulp fibers 103 is, for example, about 1 mm to 3 mm.

The cotton-like pulp fibers 103 stored in the three tanks 107*a*, 107*b* and 107*c* are accumulated on a lower transport mesh 109. The lower transport mesh 109 has a mesh shape, and a polymer compound can be used as the material thereof, and synthetic fibers of synthetic resins (thermoplastic resins) such as polytetrafluoroethylene, nylon, and PET can be used. As the lower transport mesh 109, a mesh of 30 count to 50 count including 30 to 50 openings in 1 inch×1 inch can be used, and a mesh of 40 count (for example, 0.5 mm×0.5 mm) is used in the second embodiment, but the mesh is not limited to this mesh.

The lower transport mesh 109 transports the cotton-like pulp fibers 103 that have been accumulated by a driving force from a driving source, which is not illustrated, in the direction X in the drawing. The lower transport mesh 109 repetitively transports the cotton-like pulp fibers 103 by four rolls 110 in a predetermined driving area (from the fiber accumulating step to the pressurization step by flat rolls 112).

A vacuum device 111 is disposed below the lower transport mesh 109. The vacuum device 111 is configured to adsorb the cotton-like pulp fibers 103 via the mesh-shaped transport mesh 109.

Figure 7:
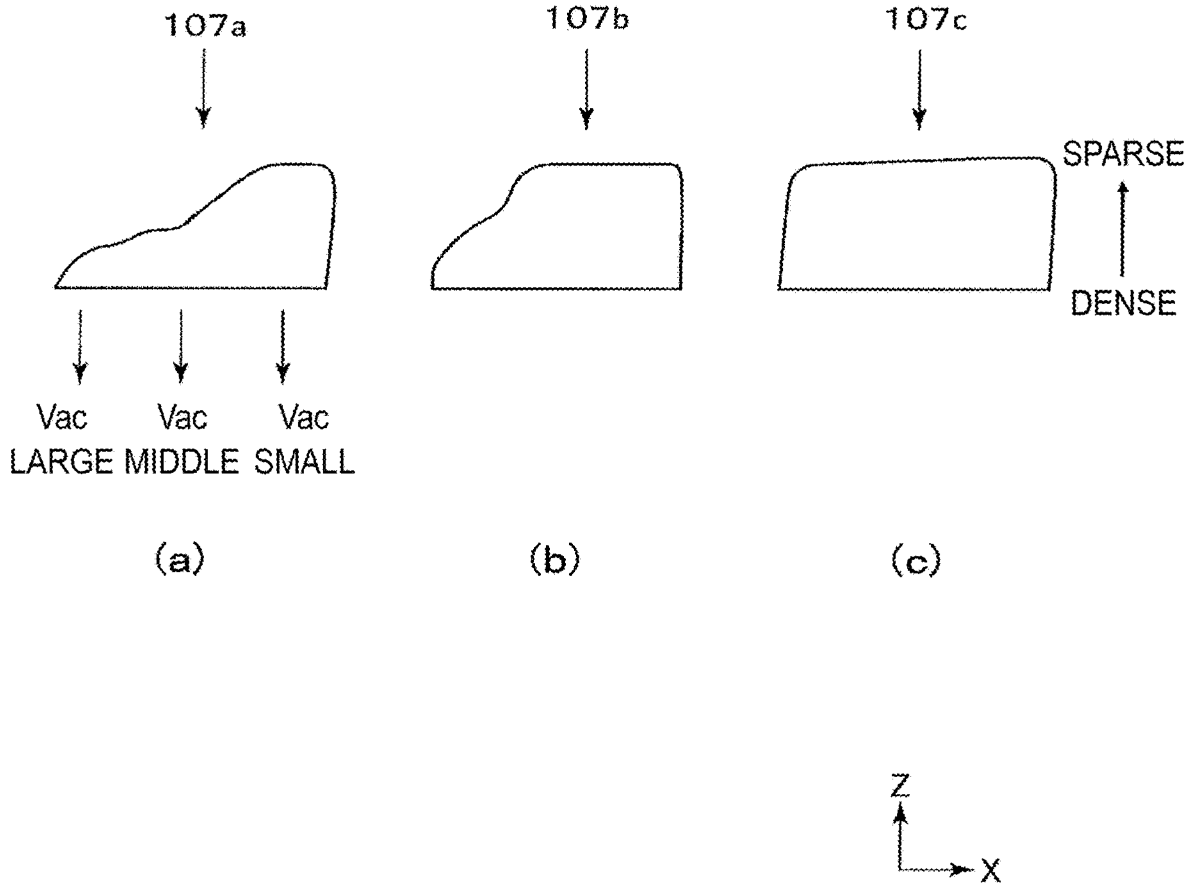
FIG. 7 is a schematic view showing cotton-like pulp fibers 103 to be subjected to fiber accumulation.

FIG. 7 is a schematic view showing the cotton-like pulp fibers 103 to be accumulated. As shown in FIG. 7(*a*), the amount of the cotton-like pulp fibers 103 accumulated on the transport mesh 109 from the tank 107*a* is larger (higher) at the right side where the accumulation time is longer, and the amount is smaller (lower) as going to the left side since the fiber accumulation time becomes shorter. However, the adsorption force by the vacuum device 111 becomes weaker as the amount of accumulation of the fibers increases. Conversely, the adsorption force by the vacuum device 111 is difficult to be weak in a part with a small accumulation amount.

Therefore, as shown in FIG. 7(*b*), the difference in fiber accumulation amount of the cotton-like pulp fibers 103 accumulated on the transport mesh 109 from the tank 107*b* decreases irrespective of the position of the transport mesh 109. Furthermore, as shown in FIG. 7(*c*), the fiber accumulation amount of the cotton-like pulp fibers 103 accumulated on the transport mesh 109 from the tank 107*c* becomes approximately even irrespective of the position of the transport mesh 109. Accordingly, by utilizing the change in the adsorption force of the vacuum device 111, the accumulation amount of the cotton-like pulp fibers 103 accumulated on the transport mesh 109 can be made approximately even. In the case when unevenness due to a position is caused in the accumulation amount of the cotton-like pulp fibers 103, the unevenness may be adjusted by shifting the position of a vacuum adsorption port, which is not illustrated, or changing the number of the vacuum adsorption ports.

Furthermore, a strong adsorption force acts immediately above the transport mesh 109, since the place is close to the vacuum device 111. Thus, the cotton-like pulp fibers 103 are accumulated densely, whereas the adsorption force by the vacuum device 111 becomes weaker as the cotton-like pulp fibers 103 get away from the transport mesh 109 (get away in the direction +Z), and thus the cotton-like pulp fibers 103 become sparse. When the pulp fibrous accumulated sheet 101 produced by the production line 100 is formed into a product, if the product is a cleaning product such as a flooring sheet or a toilet cleaner, stains can be strongly removed by applying a chemical composition onto the surface where the cotton-like pulp fibers 103 are dense. On the other hand, if the product is a product for use in skin such as a body sheet or face sheet, a skin product with fine texture can be provided by applying a chemical composition onto the surface where the cotton-like pulp fibers 103 are sparse.

In the production line 100, subsequent to the fiber accumulating step, the cotton-like pulp fibers 103 that have been accumulated are pressurized by using a plurality of pressurization devices in the pressurization step. In the second embodiment, the pressurization step includes a first pressurization step in which pressurization is conducted up to the first binder application step mentioned below, and a second pressurization step in which pressurization is conducted up to the first drying mentioned below and the second binder application step mentioned below. Plane rolls 112 have a pair of roll elements, and are used for pressurizing the accumulated cotton-like pulp fibers 103 to adjust the bulk thereof. In the second embodiment, a pressure of 4 Kgf/cm$^2$ is applied to the flat roll 112. By this way, the mesh-shaped concavity and convexity of the lower transport mesh 109 are formed on the bottom surface (the surface that is brought into contact with the lower transport mesh 109) of the pulp fibers 103. The pressure of the flat rolls 112 may be preset between 2 Kgf/cm$^2$ to 8 Kgf/cm$^2$, and the pressure may be preset depending on the use of the product using the pulp fibrous accumulated sheet 101, or whether the product is a water-disintegrable product or a non-water-disintegrable product.

As mentioned above, the mesh of the lower transport mesh 109 is 40 count (for example, 0.5 mm×0.5 mm), and the concavity and convexity in the mesh shape are formed at 0.5 mm intervals. In response to this, since the average fiber length of the crushed pulp fibers 103 is about 1 mm to 3 mm, the crushed pulp fibers 103 straddle the concavity and convexity of the mesh shape.

In the case when one does not desire to leave a mesh shape on the pulp fibers 103, the pressure of the flat roll 112 may be set to be lower than 2 Kgf/cm$^2$. Alternatively, if the lower transport mesh 109 has pressure resistance, a mesh shape may be formed on the pulp fibers 103 by applying a pressure of 8 Kgf/cm$^2$ or more. In addition, it is also possible to provide the liquid feeding devices 104 before and after the flat rolls 112 so that at least one of liquids for preventing charging with static electricity and for eliminating odor is fed. Furthermore, at least one of a pair of the roll elements that constitutes the flat rolls 112 may have an embossing of a concavo-convex shape.

In the second embodiment, the lower transport mesh 109 transports the pulp fibers 103 to the pressurization step by the flat rolls 112. Until the pressurization step by the flat rolls 116, the pulp fibers 103 are transported by utilizing the upper transport mesh 113 and the vacuum device 115. Specifically, the upper surface of the pulp fibers 103 pressurized by the flat rolls 112 is adsorbed in vacuum by a vacuum device 115 disposed on the upper side of the transport surface of the upper transport mesh 113 through the upper transport mesh 113 that is in contact with the upper surface of the pulp fibers 103. In this state, the pulp fibers 103 are transported in the direction X in the drawing by a driving force from a driving source, which is not illustrated. The transport mesh 113 repetitively transports the pulp fibers 103 by four rolls 114 in the predetermined driving area (in the step of pressurizing flat rolls 116).

The flat rolls 116 have a pair of roll elements, and pressurize the pulp fibers 103 that have passed through the flat rolls 112 to thereby adjust the bulk of the pulp fibers 103, and form the mesh shape of the upper transport mesh 113 on the upper surface (the surface to be brought into contact with the upper transport mesh 113) of the pulp fibers 103. The upper transport mesh 113 is also a mesh of 40 count as in the lower transport mesh 109. The pressure of the flat rolls 116 is also preset between 2 Kgf/cm$^2$ and 8 Kgf/cm$^2$. The pulp fibers 103 can be made soft by conducting multiple times of pressurization by the flat rolls 112 and the flat rolls 116.

An emboss 117 is configured to cooperate with the lower roll of the flat rolls 116 to emboss the pulp fibers 103 that have passed through the flat roll 116. In the second embodiment, the emboss has a ripple shape, but the shape may be any shape. Furthermore, the embossing may be conducted multiple times by disposing a plurality of embosses 117. In this case, the embosses may have an identical shape or different shapes. Furthermore, in the second embodiment, the pressure of the emboss 117 is preset at a higher pressure than the pressures present in the flat rolls 112 and 116, and is preset at, for example, between 4 Kgf/cm$^2$ and 10 Kgf/cm$^2$. The number of times of the embossing may be preset depending on the use of the product using the pulp fibrous accumulated sheet 101, or whether the product is a water-disintegrable product or a non-water-disintegrable product, or it is not necessary to conduct the embossing. In the case when the embossing is not conducted, it is preferable to preset the gap between the pair of the roll elements to be longer than thickness in the direction Z of the pulp fibrous accumulated sheet 101. In addition, as is obvious from FIG. 5, the pulp fibers 103 are not mediated by the transport mesh during the embossing. This is for preventing the transport mesh from being broken by the embossing. The pulp fibers 103 may also be embossed by the cooperation of the lower transport mesh 118, which will be mentioned below, and the emboss 117, instead of the cooperation with the lower roll of the flat roll 116. In this case, it is preferable to shift the position of the emboss 117 in the direction +X in FIG. 5 so that the emboss 117 and the lower transport mesh 118 are opposed. Alternatively, the pulp fibers 103 may be pressurized by flat rolls instead of the emboss 117 and the lower transport mesh 118.

Although the liquid is fed to the pulp fibers 103 by the liquid feeding device 104 in the second embodiment, it is sufficient that the pulp fibers 103 are not wet up to the pressurization step in the second embodiment, for example, the moisture content of the pulp fibers 103 may be about lower than 15% during the pressurization step, and may be of a degree such that the pulp fibers are not affected by static electricity due to the transport by the mesh. Therefore, in the second embodiment, if the pulp fibers 103 have a moisture content of lower than 15% during the pressurization step, then the state of the pulp fibers can be said to correspond to a non-wet state.

Furthermore, in the first pressurization step, if the flat rolls 112 and 116 and the emboss 117 are heated at a range from about 60° C. to 150° C. to set the temperature of the pulp fibers 103 to about 40° C. to 70° C. so that a binder easily permeates to the pulp fibers 103 in the binder step mentioned below, then the application amount of the binder can be reduced and thus the production cost can be decreased. The flat rolls 112 and 116 and the emboss 117 may be heated so that the temperature of the pulp fibers 103 becomes the same temperature as the dissolution temperature of the binder (for example, 40° C. to 60° C.).

In the production line 100, subsequent to the pressurization step, the binder is applied to the pulp fibers 103 in the binder application step, whereby the liquid permeable pulp fibrous accumulated layer explained in the above-mentioned exemplary embodiment is formed. In the second embodiment, the binder application step includes a first binder application step and a second binder application step, and includes a first drying step, which is mentioned below, between the first binder application step and the second binder application step. Here, the first binder application step is explained.

In the first binder application step, a binder is applied onto the upper surface of the pulp fibers 103 by a first application device 121, which is disposed on the upper side of the pulp fibers 103 and has a plurality of nozzles opposing to the pulp fibers 103. The pulp fibers 103 are mounted on a lower transport mesh 118 having a mesh shape, and are transported in the direction X in the state that the pulp fibers 103 are adsorbed in the direction −Z by a vacuum device 120, which is disposed below the lower transport mesh 118. The mesh of the lower transport mesh 118 may be a coarser mesh than the lower transport mesh 109 and the upper transport mesh 113, a mesh of 10 count to 30 count can be used, and a mesh of 16 count (for example, 1.0 mm×1.0 mm) is used in the second embodiment. The lower transport mesh 118 repetitively transports the pulp fibers 103 by four rolls 119 in a predetermined driving area (the first binder application step).

That is, in the first binder application step, the binder is applied onto the upper surface of the pulp fibers 103 by the first application device 121 from the upper side (direction +Z) to the lower side (direction −Z), and is adsorbed on the lower side of the bottom surface of the pulp fibers 103 (direction −Z) by the vacuum device 120.

As the binder to be applied (sprayed) onto the upper surface of the pulp fibers 103, either of the binders listed in the above-mentioned exemplary embodiment may be used; however, in the second embodiment, CMC is applied in the case of the pulp fibers 103 used for a water-disintegrable product, and EVA is used in the case of the pulp fibers 103 used in a non-water-disintegrable product. In addition, as mentioned above, the cotton-like pulp fibers 103 are sparser and thus the binder permeates more easily at the upper surface side of the pulp fibers 103 as compared to the bottom surface side of the pulp fibers 103. Therefore, the possibility that the binder that has been applied (sprayed) onto the upper surface of the pulp fibers 103 remains on the upper surface of the pulp fibers 103 can be reduced.

In the production line 100, a first drying step, which is one of the drying steps subsequent to the first binder application step, is conducted. In the first drying step, electromagnetic wave drying is conducted on the pulp fibers 103 mounted on the mesh-shaped lower transport mesh 122 from the upper surface side of the pulp fibers 103 as shown by an arrow by the first drying device 124. As the first drying device 124, hot air drying or infrared ray drying as exemplified in the above-mentioned exemplary embodiment may also be used. Furthermore, the lower transport mesh 122 repetitively transports the pulp fibers 103 by four rolls 123 (only two rolls are illustrated) in a predetermined driving area (the first drying step) in the state that the pulp fibers 103 are adsorbed by a vacuum device 125 positioned below the transport surface of the lower transport mesh 122. As the lower transport mesh 122, a mesh of 10 count to 30 count can be used, and a mesh of 22 count (for example, 0.7 mm×0.7 mm) is used in the second embodiment.

By conducting the first binder application step and the first drying step subsequent to the embossing by the emboss 117, the emboss shape formed on the pulp fibers 103 is easily retained.

In the production line 100, the second pressurization step is conducted subsequent to the first drying step. The second pressurization step is conducted by an emboss 126. The emboss 126 has a pair of roll elements and is an emboss having a ripple shape as in the emboss 117, but the shape thereof may be any one. Furthermore, embossing may be conducted multiple times by using a plurality of embosses 126. In this case, the embosses may have the same shape, or the embosses may have different shapes. Furthermore, the pressure of the emboss 126 can also be preset as in the emboss 117. Furthermore, as is obvious from FIG. 5, the pulp fibers 103 are not mediated by a transport mesh during the embossing also in the emboss 126, but the pulp fibers 103 may be mediated by a transport mesh. It is not always necessary to dispose the emboss 126 on the production line 100. In this case, flat rolls may be disposed instead of the emboss 126. Furthermore, in the case when the emboss 126 is disposed, flat rolls may also be used in combination.

It is desirable to heat the pair of embosses of the emboss 126 in advance as mentioned above. Since the second pressurization processing is conducted prior to the second binder application step and second drying step mentioned below, the shape of the emboss formed on the pulp fibers 103 is easily kept. The second pressurization processing may be omitted, the emboss 126 itself may be omitted, and as mentioned above, it is desirable to make the gap between the pair of roll elements longer than the thickness in the direction Z of the pulp fibrous accumulated sheet 101.

In the production line 100, the second binder application step is conducted subsequent to the second pressurization step. In the second binder application step, the second application device 130 is disposed below the bottom surface of the pulp fibers 103, and the second application device 130 having the plurality of nozzles opposing to the pulp fibers 103 applies a binder. The pulp fibers 103 are transported in the direction X through a mesh-shaped upper transport mesh 127 that is in contact with the pulp fibers 103 in the state that the pulp fibers 103 are adsorbed by a vacuum device 129 in the direction +Z. The upper transport mesh 127 repetitively transports the pulp fibers 103 by four rolls 128 in a predetermined driving range (second binder application step). The count of the upper transport mesh 127 may be the same count as the count of the lower transport mesh 118.

That is, in the second binder application step, the second application device 130 applies the binder onto the bottom surface of the pulp fibers 103 from the lower side (direction −Z) to the upper side (direction +Z), and allows the binder to be adsorbed on the upper side (direction +Z) with respect to the upper surface of the pulp fibers 103 by the vacuum device 129.

The binder applied in the second binder application step is same as the binder applied in the first binder application step. In the second binder application step, the binder is applied onto the bottom surface of the pulp fibers 103 from the plurality of nozzles positioned below the pulp fibers 103, and thus the binder that has not permeated into the pulp fibers 103 falls without remaining on the pulp fibers 103. Therefore, uneven application of the binder does not occur. Accordingly, the unevenness in strength and unevenness in drying of the pulp fibrous accumulated sheet 101 that has undergone the second drying step mentioned below, can be reduced.

Furthermore, in the first and second binder application steps, the binder is applied onto the upper and bottom surfaces of the pulp fibers 103 without reversing the pulp fibers 103. Therefore, the production line 100 can be prevented from being complex, and the speed of the transport of the pulp fibers 103 can be increased.

In the first and second binder application steps, if a cover for preventing diffusion of the binder is installed to thereby form a closed space, and the binder that has not been applied onto the pulp fibers 103 is collected by a pump or the like and fed again to the first application device 121 and the second application device 130, then the use amount of the binder can be reduced, and the cost for the production of the pulp fibrous accumulated sheet 101 can be reduced.

In the production line 100, subsequent to the second binder application step, a second drying step, which is another drying step, is conducted. In the second drying step, the pulp fibers 103 are transported in the direction X through a mesh-shaped upper transport mesh 131 that is in contact with the upper surface of the pulp fibers 103, in the state that the pulp fibers 103 are adsorbed in the direction +Z by a vacuum device 132 disposed on the upper side of the transport surface of the upper transport mesh 131. In the second drying step, as shown by an arrow, electromagnetic wave drying is conducted from the bottom surface side of the pulp fibers 103 in the second drying device 133. The hot air drying or infrared ray drying as exemplified in the above-mentioned exemplary embodiment may also be used.

The upper transport mesh 131 repetitively transports the pulp fibers 103 by four rolls 134 (only two rolls are illustrated) in a predetermined driving area (the second drying step) in the state that the pulp fibers 103 are adsorbed by the vacuum device 132 as mentioned above. The count of the upper transport mesh 131 may be the same as the count of the lower transport mesh 122.

Alternatively, the embossing may be conducted after the second drying step.

In the production line 100, the pulp fibrous accumulated sheet 101 is formed by undergoing the second drying step, and this pulp fibrous accumulated sheet 101 is transported by a transport roll 135 and then wound by two winding rolls 136 and 137.

As mentioned above, the pulp fibrous accumulated sheet 101 is produced without undergoing any papermaking step also in the second embodiment. The crushing step may also be preset so as to give an average fiber length so as to straddle the lower transport mesh 109 and upper transport mesh 113, based on the counts of the meshes.

The present invention is not limited to the embodiments explained above as a matter of course, and encompasses every embodiment that can achieve the object of the present invention.

REFERENCE SIGNS LIST

2 Liquid permeable pulp fibrous accumulated layer
**2*a*** Fiber crimped part
**2*b*** Crushed pulp fiber
5 Crushed pulp
106 Crushing device
107 Fiber accumulating device
117 Embossing
121 First application device
124 First drying device
130 Second application device
133 Second drying device

The invention claimed is:

1. A method for producing a pulp fibrous accumulated sheet, comprising:

embossing base-fibers by sending the base-fibers between a pair of emboss rolls each having a plurality of projections on a circumference surface thereof, such that a plurality of crimped parts is formed in the base-fibers;

applying a binder onto the base-fibers from a first direction, and adsorbing the base-fibers along the first direction; and applying a binder onto the base-fibers from a second direction, which is different from the first direction, and adsorbing the base-fibers along the second direction, wherein the embossing is performed prior to application of any binder to the base-fibers, wherein the base-fibers comprise a crushed pulp, the pulp fibrous accumulated sheet has a top surface and a bottom surface, the top surface has a concavo-convex shape formed by fiber crimped parts in the shape of a concave and a plurality of convex projections positioned between straddling the fiber crimped parts adjacent to each other, and a thickness between the top surface and the bottom surface at the concave is smaller than a thickness between the top surface and the bottom surface at the convex projections, and the fiber crimped parts are formed such that fibers of the crushed pulp straddle from a fiber crimped part to an adjacent fiber crimped part.

2. The method according to claim 1, wherein the applying of the binder from the second direction comprises applying the binder to a bottom surface of the base-fibers, and the adsorbing of the base-fibers along the second direction comprises adsorbing the base-fibers from an upper surface of the base-fibers.

3. The method according to claim 1, further comprising:

transporting the base-fibers by adsorbing an upper surface of the base-fibers via a contact element that is in contact with the upper surface.

4. The method according to claim 1, further comprising: feeding a gas along the first direction prior to the applying of the binder from the second direction.

5. The method according to claim 1, further comprising: feeding a gas along the second direction after the applying of the binder from the second direction.

6. The method according to claim 1, further comprising: pressurizing the base-fibers with a plane roll prior to the embossing.

7. The method according to claim 1, further comprising: removing static electricity in the base-fibers.

8. The method according to claim 1, further comprising: applying an alum onto the base-fibers.

9. The method according to claim 8, wherein the alum is applied as a liquid.

10. The method according to claim 1, wherein the pulp fibrous accumulated sheet is a non-water-disintegrable sheet.

* * * * *